(12) United States Patent
Jacon et al.

(10) Patent No.: US 11,746,706 B2
(45) Date of Patent: Sep. 5, 2023

(54) AIR-SEALING DEVICE INTENDED TO BE INSERTED BETWEEN AN AIRCRAFT DUAL-FLOW TURBINE ENGINE CASING ELEMENT, AND A NACELLE ELEMENT

(71) Applicant: SAFRAN AIRCRAFT ENGINES, Paris (FR)

(72) Inventors: Bruno Alexandre Didier Jacon, Moissy-Cramayel (FR); Baghdad Achbari, Moissy-Cramayel (FR); Faouzi Aliouat, Moissy-Cramayel (FR); Hervé Simonotti, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 201 days.

(21) Appl. No.: 17/299,963

(22) PCT Filed: Nov. 19, 2019

(86) PCT No.: PCT/FR2019/052744
§ 371 (c)(1),
(2) Date: Jun. 4, 2021

(87) PCT Pub. No.: WO2020/115383
PCT Pub. Date: Jun. 11, 2020

(65) Prior Publication Data
US 2021/0332762 A1    Oct. 28, 2021

(30) Foreign Application Priority Data
Dec. 5, 2018    (FR) ........................ 1872399

(51) Int. Cl.
*F02C 7/28*    (2006.01)
*F16J 15/06*    (2006.01)
(Continued)

(52) U.S. Cl.
CPC .............. *F02C 7/28* (2013.01); *F01D 11/003* (2013.01); *F01D 11/005* (2013.01);
(Continued)

(58) Field of Classification Search
CPC ........ F02C 7/28; F01D 11/003; F01D 11/005; F01D 25/265; F16J 15/027; F16J 15/061;
(Continued)

(56) References Cited

U.S. PATENT DOCUMENTS 2,451,450 A * 10/1948 Spraragen ............. E06B 7/2318
                                                    49/498.1
6,655,635 B2 * 12/2003 Maury ................... F16J 15/027
                                                    244/119
(Continued)

FOREIGN PATENT DOCUMENTS

RU        2791986 C2    3/2023

OTHER PUBLICATIONS

Search Report issued in French Patent Application No. 1872399 dated Jul. 22, 2019.
(Continued)

*Primary Examiner* — Loren C Edwards
(74) *Attorney, Agent, or Firm* — Pearne & Gordon LLP

(57) ABSTRACT

An air-sealing device intended to be inserted between an aircraft dual-flow turbine engine casing element and a nacelle element, the sealing device including an attachment tab at the end of which is located a sealing portion having an outer surface intended to be contacted by the casing element and the nacelle element, and an inner surface defining a cavity. The inner surface defines at least one protuberance extending inside the cavity.

12 Claims, 4 Drawing Sheets

(51) Int. Cl.
*F01D 11/00* (2006.01)
*F01D 25/26* (2006.01)
*F16J 15/02* (2006.01)

(52) U.S. Cl.
CPC .......... *F01D 25/265* (2013.01); *F16J 15/027* (2013.01); *F16J 15/061* (2013.01); *F05D 2220/323* (2013.01); *F05D 2240/55* (2013.01); *F05D 2250/291* (2013.01); *F05D 2300/437* (2013.01); *F05D 2300/614* (2013.01)

(58) Field of Classification Search
CPC .......... F05D 2220/323; F05D 2240/55; F05D 2250/291; F05D 2300/437; F05D 2300/614
See application file for complete search history.

(56) References Cited

U.S. PATENT DOCUMENTS

| | | | | |
|---|---|---|---|---|
| 7,219,899 | B2* | 5/2007 | Kesseg | B60J 10/80 |
| | | | | 277/921 |
| 7,487,616 | B2* | 2/2009 | Deaver | B60J 10/24 |
| | | | | 277/648 |
| 9,452,819 | B2* | 9/2016 | Zeon | B64C 7/00 |
| 2006/0220328 | A1 | 10/2006 | Deaver | |
| 2011/0024994 | A1* | 2/2011 | Bunel | F16J 15/027 |
| | | | | 277/637 |
| 2013/0341875 | A1 | 12/2013 | LeBlanc et al. | |
| 2015/0218957 | A1* | 8/2015 | Klinetob | F01D 11/005 |
| | | | | 60/726 |
| 2021/0003098 | A1 | 1/2021 | Jacon et al. | |
| 2021/0095569 | A1 | 4/2021 | Jacon et al. | |

OTHER PUBLICATIONS

International Search Report for issued in Application No. PCT/FR2019/052744 dated Apr. 2, 2020.
Written Opinion for PCT/FR2019/052744 dated Apr. 2, 2020.

* cited by examiner

AIR-SEALING DEVICE INTENDED TO BE INSERTED BETWEEN AN AIRCRAFT DUAL-FLOW TURBINE ENGINE CASING ELEMENT, AND A NACELLE ELEMENT

This is the National Stage of PCT international application PCT/FR2019/052744, filed on Nov. 19, 2019 entitled "IMPROVED AIR-SEALING DEVICE INTENDED TO BE INSERTED BETWEEN AN AIRCRAFT DUAL-FLOW TURBINE ENGINE CASING ELEMENT AND A NACELLE ELEMENT", which claims the priority of French Patent Application No. 1872399 filed Dec. 5, 2018, both of which are incorporated herein by reference in their entireties.

TECHNICAL FIELD

The invention relates to air-sealing devices intended to be inserted between an aircraft dual-flow turbine engine casing element, and a nacelle element adjacent to the casing element.

The invention applies to any type of dual-flow turbine engine, and in particular to a turbojet engine.

PRIOR ART

In an aircraft dual-flow turbine engine, one or more sealing areas are generally provided between the casing of the turbine engine and the nacelle, in particular to limit leaks from the secondary flow, in particular in the direction of a fan compartment of the turbine engine.

To limit these potential air leaks, conventional solutions can be considered, but they are generally not entirely satisfactory. Indeed, the sealing devices intended to be installed in these areas must meet many constraints, making their design particularly complex. One of the main constraints is having to have sufficiently high rigidity in operation to withstand air pressure, regardless of the level of deformation of the sealing device. This purpose leads to providing for a very high rigidity, but this must nevertheless remain low enough to allow the nacelle element to be mounted on the casing element.

These contradictory constraints make the design difficult. Consequently, there remains a need to achieve an air-sealing device, the design of which guarantees the desired functions.

SUMMARY OF THE INVENTION

To meet the need, the invention firstly relates to an air-sealing device intended to be inserted between an aircraft dual-flow turbine engine casing element and a nacelle element, the sealing device comprising the features of claim 1.

The protuberances advantageously allow to limit the sagging of the sealing portion of the device. Thus they provide a satisfactory response to the expressed need, in particular by ensuring increased rigidity in the event of maximum compression, thanks to the bearing provided by these protuberances.

The invention preferably provides for at least one of the following optional technical features, taken individually or in combination.

Each protuberance extends in the direction of a centre of the hollow delimited by the sealing portion.

In cross section of the sealing device, each protuberance defines a protuberance height direction arranged to form an angle comprised between 40 and 60° with a direction wherein the fixing tab extends. Preferably, this angle is of the order of 50°. These values of the angle A1 correspond to those observed in the unconstrained state of the sealing portion of the device.

The protuberance height directions of the two protuberances are coincident, preferably passing through a centre of the hollow delimited by the sealing portion.

The sealing portion forms a closed loop internally delimiting said hollow, the closed loop preferably being of substantially circular shape in the unconstrained state. Other shapes can nevertheless be adopted, such as an oval or oblong shape, without departing from the scope of the invention.

The sealing portion is crossed by one or more pressurisation orifices in the hollow. This allows to strengthen the contact between the sealing portion delimiting this hollow, and the casing and nacelle elements.

The sealing portion has at least one of the following features, and preferably the combination of each of these features:
- it is made from an elastomeric material, preferably a silicone elastomeric material;
- It comprises at least one fibrous reinforcing layer, preferably made of polyester;
- It includes at least one outer anti-friction layer, preferably made of pre-cured polyester fabric.

The object of the invention is also a propulsion unit for an aircraft comprising an aircraft dual-flow turbine engine, a nacelle, as well as at least one such air-sealing device inserted between a casing element of the turbine engine, and a nacelle element.

Preferably, the casing element is an outer shroud of an intermediate casing of the turbine engine, and the nacelle element is a cowling radially outwardly delimiting a secondary flow path of the propulsion unit.

Other advantages and features of the invention will become apparent in the non-limiting detailed description below.

BRIEF DESCRIPTION OF THE DRAWINGS

This description will be made with reference to the appended drawings among which.

DETAILED DESCRIPTION OF PREFERRED EMBODIMENTS

Figure 1:
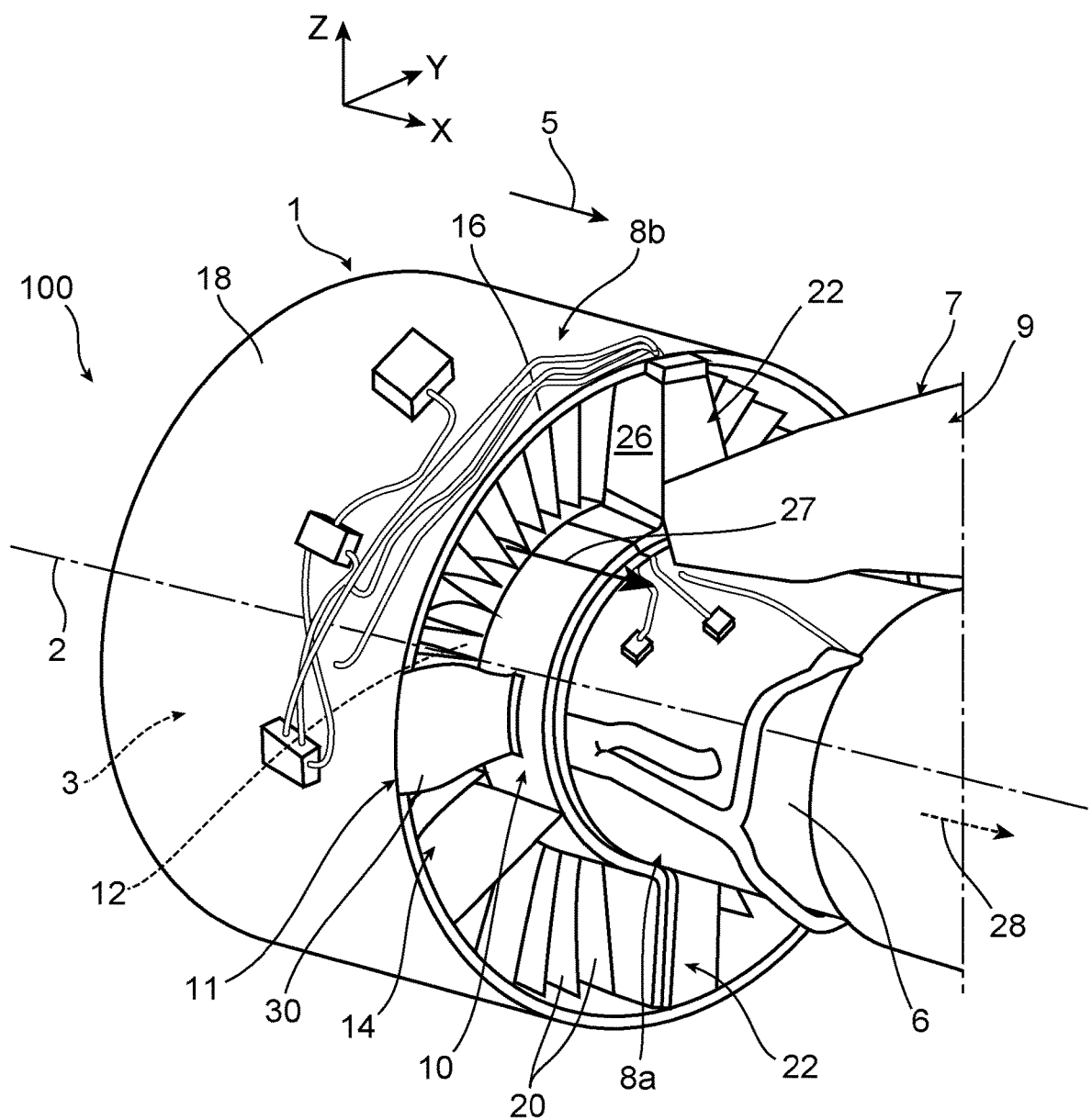
FIG. 1 is a partial and schematic perspective view of a propulsion unit according to a preferred embodiment of the invention.

Referring firstly to FIG. 1, a propulsion unit 100 according to a preferred embodiment of the invention is partially shown. This unit 100 includes a dual-flow turbine engine 1 for an aircraft, a pylon 9 for attaching this turbine engine on a wing element of the aircraft (not shown), as well as a nacelle 11 shown only very partially.

The propulsion unit 100 has a longitudinal direction X, also corresponding to the longitudinal direction of the turbine engine 1 and to that of the pylon 9. The unit 100 also has a transverse direction Y, as well as a vertical direction Z, corresponding to the height direction. The three directions X, Y and Z are orthogonal to each other and form a direct trihedron.

Preferably, the pylon 9 allows to suspend the turbine engine 1 under a wing of the aircraft. This pylon includes a structural portion intended to take up the forces coming from the turbine engine, this portion usually being called primary structure or rigid structure. It generally takes the shape of a box, only one upstream end 7 of which is shown in FIG. 1. The pylon is also equipped with secondary structures (not shown) in the shape of aerodynamic fairings.

In the preferred embodiment described and shown, the turbine engine 1 is a dual-flow and dual-body turbojet engine. The turbojet engine 1 has a longitudinal central axis 2 parallel to the direction X, and around which extend its various components. It comprises, from upstream to downstream in a main direction 5 of gas flow through this turbine engine, a fan 3 then a gas generator conventionally formed by compressors, a combustion chamber and turbines. These elements of the gas generator are surrounded by a central casing 6, also called a "core" casing, which radially inwardly delimits an inter-flow compartment 8a. This compartment 8a is moreover delimited radially outwardly by one or more cowlings, including an upstream ring 10 which is the only one shown in FIG. 1. The upstream ring 10 is arranged in the downstream continuity of a hub 12 of an intermediate casing 14 of the turbojet engine. The intermediate casing 14 also includes an outer shroud 16 located in the downstream continuity of a fan casing 18. It also includes outlet guide vanes 20, arranged downstream of the fan vanes and connecting the hub 12 to the outer shroud 16.

The fan casing 18 and the outer shroud 16 together delimit, radially inwardly, a fan compartment 8b. This compartment 8b is moreover delimited radially outwardly by one or more cowlings (not shown), forming part of the nacelle 11. Just like the inter-flow compartment 8a, this compartment 8b houses equipment and utilities, like this is widely known from the prior art.

One or more arms 22 are provided to connect the two compartments 8a, 8b. These are for example two arms 22 which equip the turbojet engine, respectively arranged in clock positions called 12 o'clock and 6 o'clock. These arms 22 are hollow, and they allow, for example, to circulate electric cables, and/or fluidic conduits. More specifically, these arms connect a downstream portion of the outer shroud 16, to the upstream ring 10. For this purpose, they pass through a secondary flow path 26 of the turbojet engine, this flow path being delimited outwardly by the shroud 16, as well as by one or more nacelle cowlings 30 located in the downstream continuity of the shroud 16. This flow path 26 allows the circulation of a secondary flow, shown schematically by the arrow 27.

The secondary flow path 26 is also partly delimited inwardly by the upstream ring 10 of the inter-flow compartment 8a. It is added to a primary flow path through which a primary flow 28 passes, which is routed conventionally by the gas generator.

The invention lies in the manner of making an airtight junction between the downstream end of the shroud 16 of the intermediate casing, and the upstream end of the nacelle cowling 30. This sealed junction allows indeed to limit, or even prohibit the recirculation of the secondary flow 27 in the direction of the nacelle compartment 8b, since such recirculation stands for a loss of performance associated with the propulsion unit, with an impact on the specific fuel consumption.

To ensure this sealing, provision is made of one or more air-sealing devices inserted between the shroud 16 of the intermediate casing, and the nacelle cowlings 30. Preferably, these are several sealing devices of identical or similar design which follow one another along the circumferential direction of the shroud 16. Each device can have a circumferential length of up to 1.5 or 2 m. Nevertheless, a non-sectorised design remains possible, without departing from the scope of the invention.

The installation of one of these sealing devices, within the propulsion unit, will now be described with reference to FIGS. 2 and 3.

The shroud 16 of the intermediate casing 14 ends downstream with a radial collar 32, and with an annular support flange 34 of preferably frusto-conical shape which narrows as it goes downstream. These two elements 32, 34 form an annular space 36 wherein one of the air-sealing devices 40 is housed. The latter has two distinct portions integral with one another. It is first of all a fixing tab 42, in surface bearing against the support flange 34. The fixing tab 42 is glued with an RTV ("Room Temperature Vulcanisation") silicone adhesive on this flange 34, and preferably clamped between this flange 34 and fixing plates 46 covering it. Preferably, the tab 42 is thus glued, while the plates 46 serve as an abutment as well as to protect this tab 42.

The plates 46 are fixed by rivets 48 or similar elements on the support flange 34, being pressed against the radially outer surface of the fixing tab 42. The latter extends in the circumferential direction all along the device 40, just like a sealing portion 44 located at the upstream end of the tab 42. This sealing portion 44, which will be described in detail later, is located in the annular space 36 so that its outer surface is contacted by the flange 34, and by a sealing bead 50 of the nacelle cowling 30.

The sealing bead 50 is integrated into a junction ring 52 located at the upstream end of the nacelle cowl 30. This ring 52 has a portion, half the cross section of which takes the shape of a J, the radially inner end of which presses on the sealing portion 44 of the device 40. This radially inner end of the J thus corresponds to the sealing bead 50. The radially outer end of the J can in turn form a scalloped flange for its fixing to another portion of the nacelle cowling 30.

The ring 52 also includes a sealing lip 56, the free upstream end of which is located opposite a free downstream end of the support flange 34. The cooperation between these two ends allows to reduce air access from the secondary flow path 26, to the annular space 36 housing the bead 50.

Figure 2:
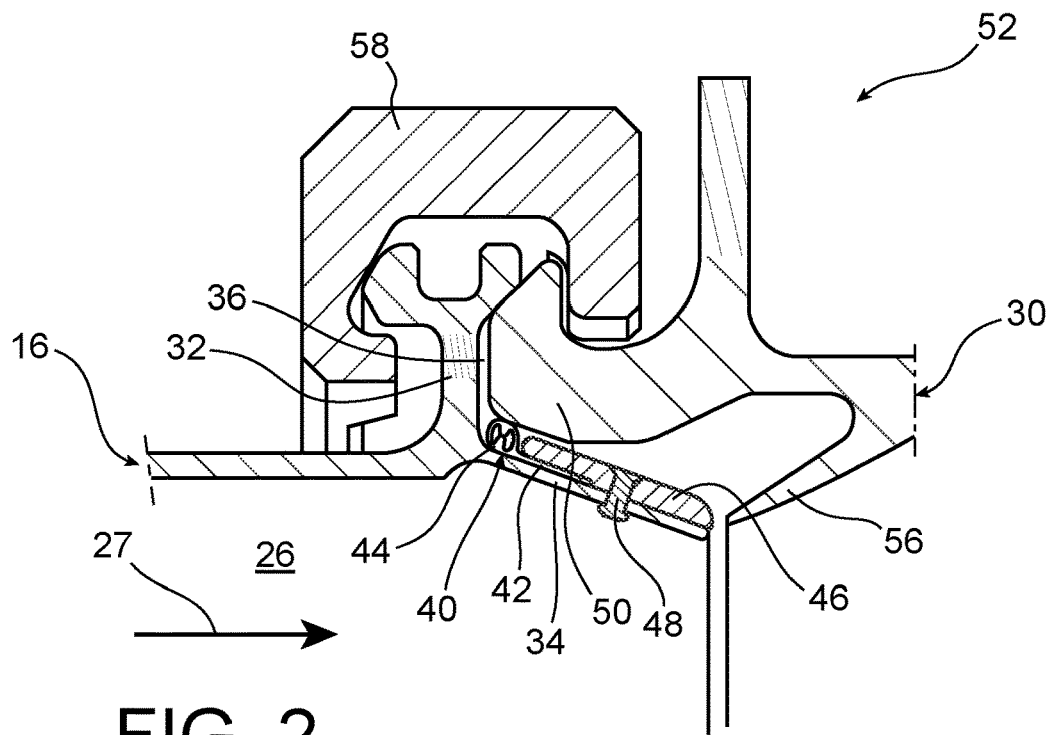
FIG. 2 shows a cross-sectional view of a portion of the propulsion unit shown in the previous figure, showing in particular the installation of a sealing device according to a preferred embodiment of the invention, between a casing element and a nacelle element.
Figure 3:
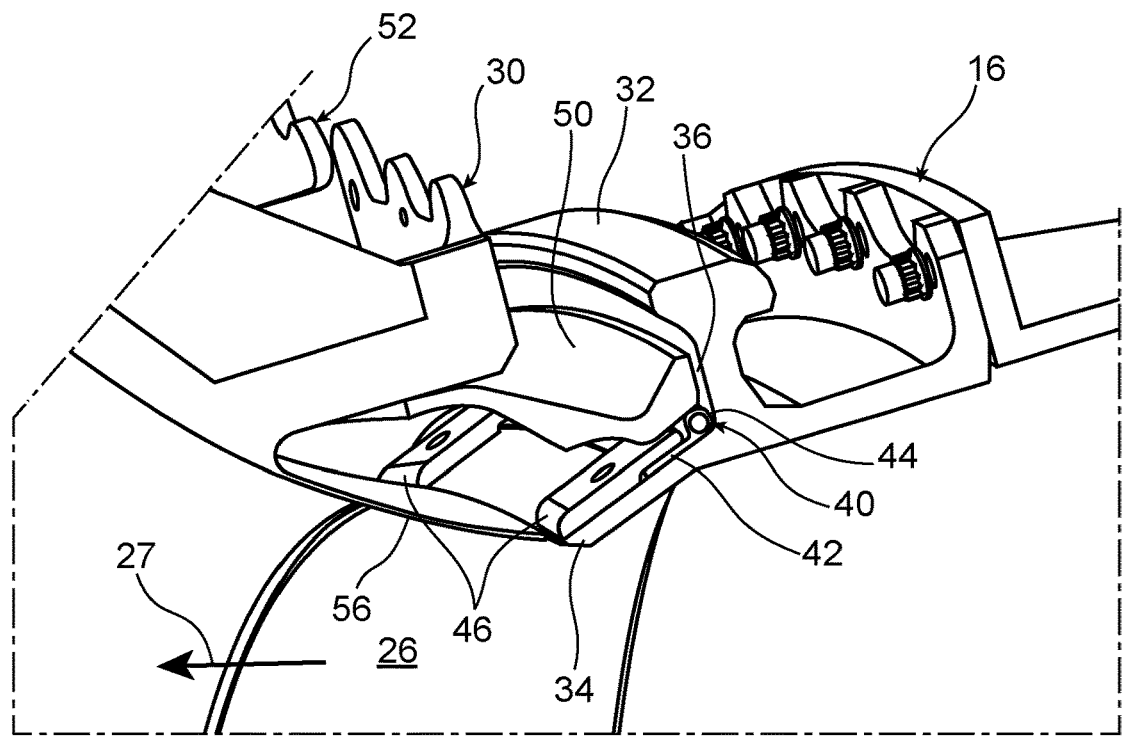
FIG. 3 shows a perspective view of the portion shown in the previous figure.

An outer ring or ring sector 58 may axially clamp the radially outer end of the J and the flange 32 of the shroud 16 of the intermediate casing 14, as shown in FIG. 2.

Figure 4:
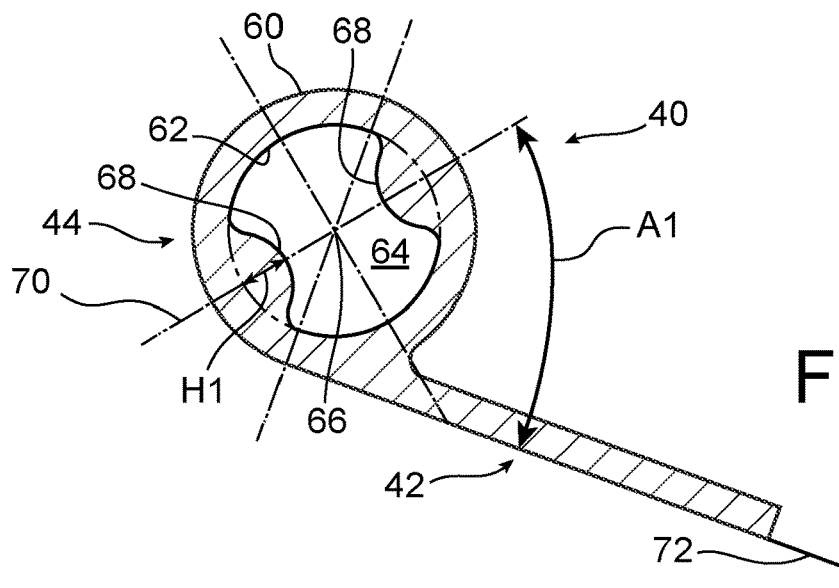
FIG. 4 shows a view in any cross section of the sealing device shown in FIGS. 2 and 3, with this device in the unconstrained state.

FIG. 4 shows the air-sealing device 40, in any cross section. Preferably, this section remains identical or similar all along the device 40, in the circumferential direction of the latter.

As mentioned above, the sealing portion 44 is arranged integrally at the end of the fixing tab 42, these two elements 42, 44 being produced within the same part. In the unconstrained state as shown in the cross section of FIG. 4, the sealing portion 44 has the overall shape of a closed loop, which is substantially circular. It has a substantially circular outer surface 60, as well as an inner surface 62 delimiting a hollow 64 having a centre 66. In the unconstrained state, the outer surface 60 may have a diameter comprised between 6 and 10 mm, for example of the order of 8 mm.

The inner surface 62 is not entirely circular, since it defines two opposite protuberances 68, preferably in the shape of lobes projecting inwardly of the hollow 64. Outside of the areas incorporating the protuberances 68, the inner surface 62 may have a diameter comprised between 4 and 8 mm, for example of the order of 6 mm. Thus, the sealing portion 44 has a variable thickness, with protuberances 68 which protrude to a height H1 of the order of 1 and 3 mm.

The two protuberances 68 are preferably diametrically opposite, extending towards each other in directions of height of the protuberance 70 which are here coincident, and which pass through the centre of the hollow 64.

In operation, in the case of high stresses applying to the sealing portion 44, the two protuberances 68 are intended to be in contact with one another in order to limit the sagging of this portion 44.

A preferred angle A1 is retained between the protuberance 70 height direction, and the direction 72 along which the fixing tab 42 extends. This angle is determined so as to ensure that following a consequent deformation of the sealing portion 44 between the nacelle and the shroud of the intermediate casing, the two protuberances 68 contact each other. This angle A1 is of the order of 50° in the unconstrained state. Consequently, by choosing this order of magnitude for the angle A1, account is advantageously taken of the fact that the crushing of the sealing portion 44 between the nacelle and the shroud also causes a modification of the orientation of the direction 70 of the protuberances. Indeed, this direction 70 of the two protuberances 68 tends to cause the angle A1 to evolve towards the value of 90°, as the level of stresses increases on the sealing portion 44.

Figure 5:
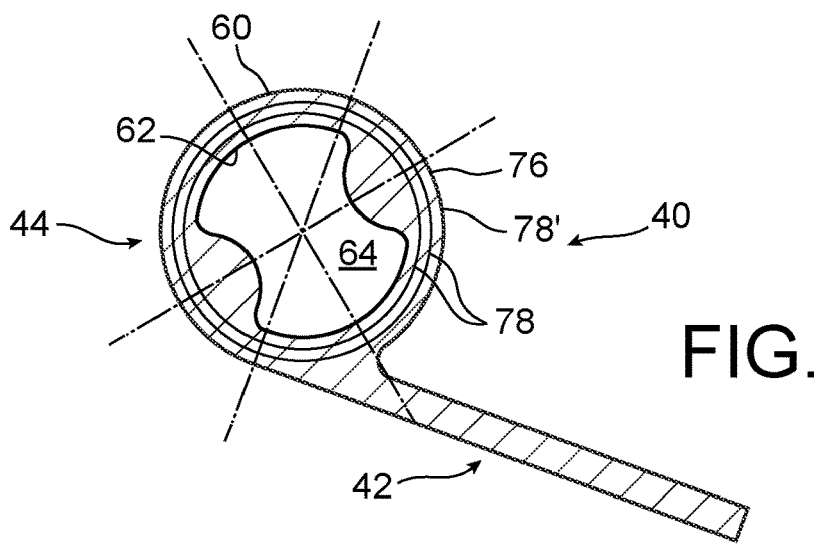
FIG. 5 shows a view similar to that of FIG. 4, according to an alternative embodiment.

The sealing portion 44, like the sealing tab 42, can be made from an elastomeric material, preferably from a silicone elastomeric material. For example, the sealing device 40 can be made in one piece, only using this elastomeric material. In another embodiment shown schematically in FIG. 5, the sealing portion 44 has a base 76 made of elastomeric material, which is completed by at least one fibrous reinforcing layer 78. This allows to increase the rigidity of the sealing portion 44, in particular when its level of deformation is not high enough to contact the two lobes 68 with one another.

Each fibrous layer is preferably circular, depending on the general shape of the sealing portion 44. The number of layers can be comprised between one and three, for example two reinforcing layers 78 embedded in the base 76, and an outer layer 78' forming the outer surface 60. This outer layer 78' has an anti-friction function, so as to limit the friction of the shroud and of the nacelle cowling on the sealing portion 44 when assembling this cowling, and thus limit the effects of axial stretching of this portion 44. To ensure this anti-friction function, the outer layer 78' is preferably made of pre-cured polyester fabric, for example with several layers of this type of fabric. The outer layer 78' can only serve as an anti-friction coating, or else also provide a reinforcing function like the embedded layers 78. The latter are for example made of polyester. A combination of these materials is also possible, without departing from the scope of the invention.

Figure 6:
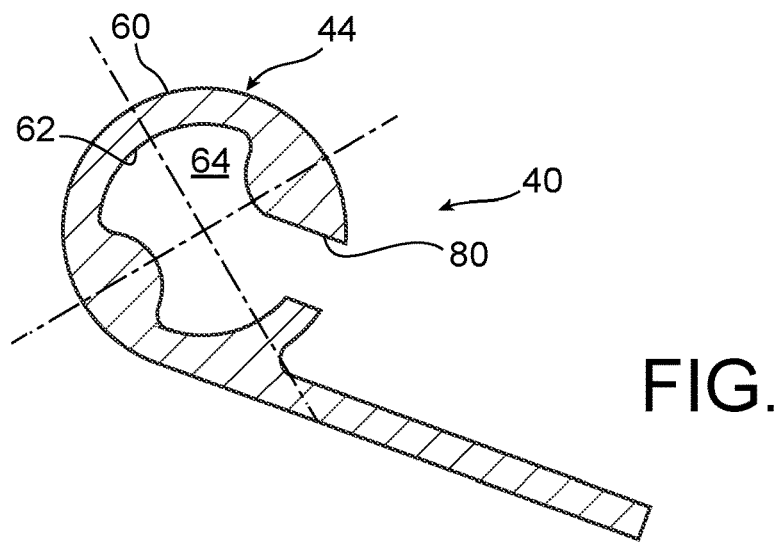
FIG. 6 shows a view similar to that of FIGS. 4 and 5, according to another alternative embodiment.

Regardless of the material(s) selected to make the sealing portion 44, the latter is either completely closed all along the loop, or equipped with one or more orifices 80 passing therethrough. This other alternative is shown schematically in FIG. 6. The orifices 80 ensure the pressurisation of the hollow 64, allowing air from the secondary flow to enter this same hollow. This results in better contact between the outer surface 60 of the sealing portion 44, and the two elements to be sealed. In this alternative, the pressurisation orifices 80 are made so as to maintain a closed loop character for the sealing portion 44, so that they each extend only over a portion of the circumferential length of the device 40.

Figure 7:
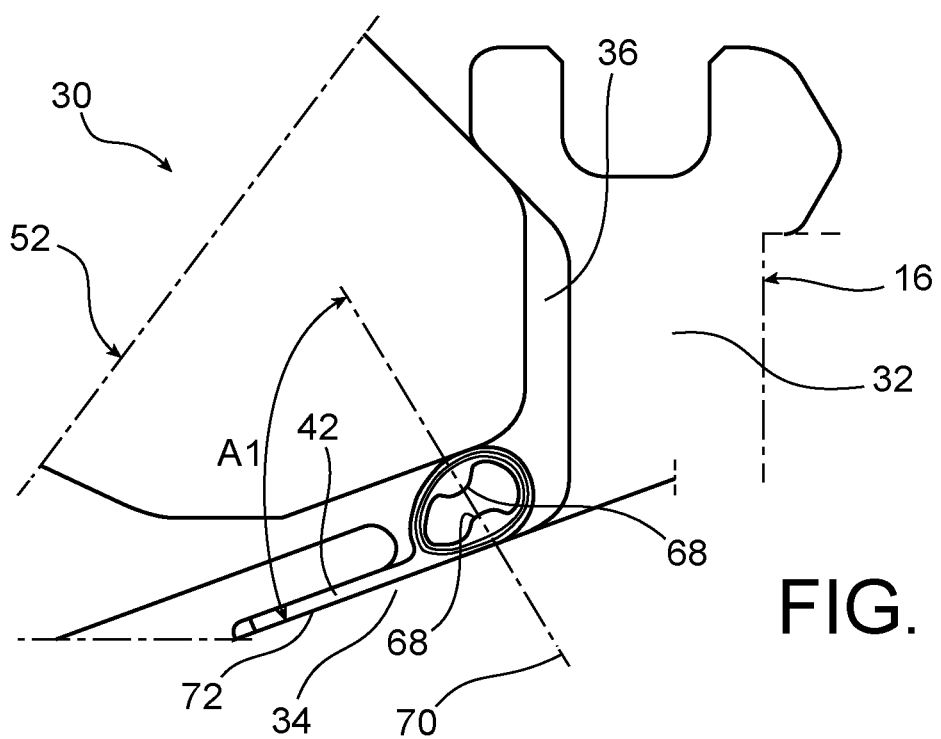
FIG. 7 is a schematic view similar to that of FIG. 2, with the sealing device having minimal compression between the casing and the nacelle.
Figure 8:
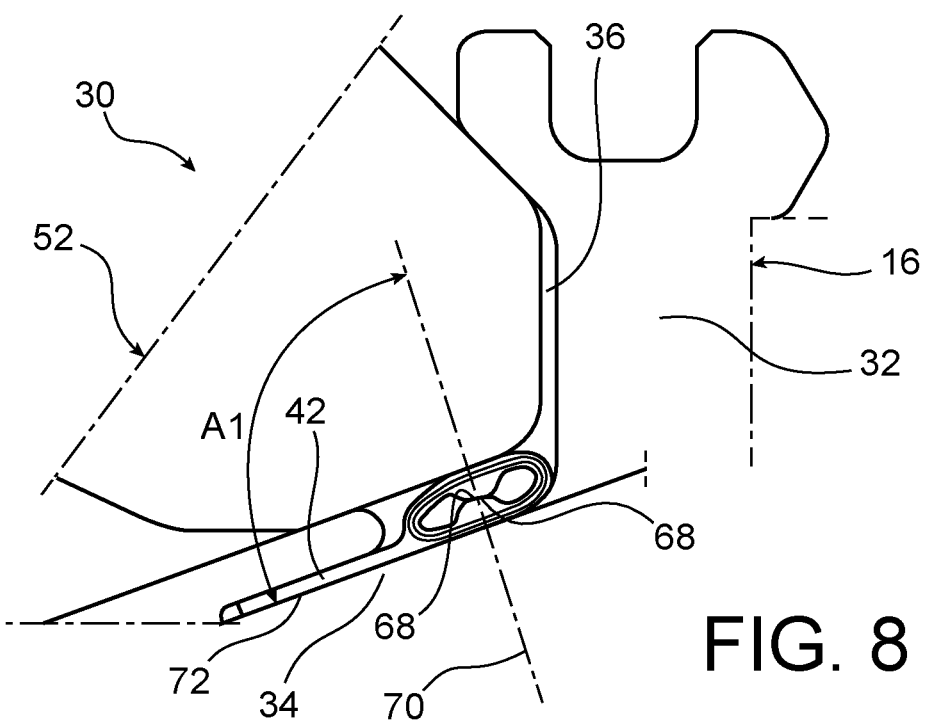
FIG. 8 is a schematic view similar to that of FIG. 2, with the sealing device having maximum compression between the casing and the nacelle.

Finally, FIGS. 7 and 8 show the air-sealing device 40 in different levels of compression between the flange 34 of the intermediate casing 14, and the junction ring 52 of the nacelle cowling 30. This level of compression varies due to manufacturing and assembly tolerances, but also depending on the deformations and relative displacements observed in operation between these two elements. FIG. 7 shows a minimum level of deformation encountered when the ring 52 is furthest from the flange 34. In this case, the two lobes 68 are spaced apart from each other. On the other hand, FIG. 8 shows a maximum level of deformation, encountered when the ring 52 is very close to the flange 34. In this case, the contact between the two lobes 68 contributes to the rigidity of the sealing portion 44, the sagging of which is limited. The contacts between this sealing portion 44 and the two elements 52, 34 are reinforced, involving zero or limited risks of air leaks coming from the secondary flow path 26. In these FIGS. 7 and 8, the evolution of the value of the angle A1, which increases with the level of compression of the sealing portion 44. In the state of maximum compression shown in FIG. 8, with an angle A1 close to or equal to 90°, the lobes 68 are oriented with their direction 70 locally substantially orthogonal to the contact surfaces provided on the ring 52 and the flange 34.

Of course, various modifications can be made by the person skilled in the art to the invention which has just been described, only by way of non-limiting examples, and the scope of which is defined by the appended claims. In particular, the air-sealing device described above could be installed between other casing and nacelle elements, without departing from the scope of the invention.

What is claimed is:

1. An air-sealing device adapted to be inserted between an aircraft dual-flow turbine engine casing element and a nacelle element, the sealing device comprising a fixing tab at an end of which there is a sealing portion having an outer surface adapted to be contacted by the casing element and the nacelle element, and an inner surface delimiting a hollow,
   wherein the inner surface defines two opposite protuberances, extending inside the hollow towards each other, and in that in cross section of the sealing device, each protuberance defines a protuberance height direction arranged to form an angle comprised between 40° and 60° with a longitudinal direction of the fixing tab.

2. The device according to claim 1, wherein each protuberance extends towards a center of the hollow delimited by the sealing portion.

3. The device according to claim 2, wherein the protuberance height directions of the two protuberances are coincident.

4. The device according to claim 3, wherein the protuberance height directions pass through a center of the hollow delimited by the sealing portion.

5. The device according to claim 1, wherein the sealing portion forms a closed loop internally delimiting said hollow.

6. The device according to claim 5, wherein the sealing portion is crossed by one or more pressurization orifices in the hollow.

7. The device according to claim 5, wherein the closed loop is of substantially circular shape in an unconstrained state.

8. The device according to claim 1, wherein the sealing portion is made from an elastomeric material; or the sealing portion comprises at least one fibrous reinforcing layer; or the sealing portion includes at least one outer anti-friction layer; or a combination of the foregoing.

9. The device according to claim 8, wherein the elastomeric material is a silicone elastomeric material.

10. The device according to claim 8, wherein the at least one fibrous reinforcing layer is made of polyester.

11. A propulsion unit for an aircraft comprising an aircraft dual-flow turbine engine, a nacelle, as well as at least one air-sealing device according to claim 1, inserted between a casing element of the turbine engine, and a nacelle element of the nacelle.

12. The unit according to claim 11, wherein the casing element is an outer shroud of an intermediate casing of the turbine engine, and the nacelle element of the nacelle is a cowling radially outwardly delimiting a secondary flow path of the propulsion unit.

* * * * *